Feb. 8, 1966   M. ARDITI   3,234,483
HIGH STABILITY GAS CELL FREQUENCY STANDARD
Filed March 20, 1964   3 Sheets-Sheet 1

INVENTOR.
MAURICE ARDITI
BY Edward Goldberg
ATTORNEY

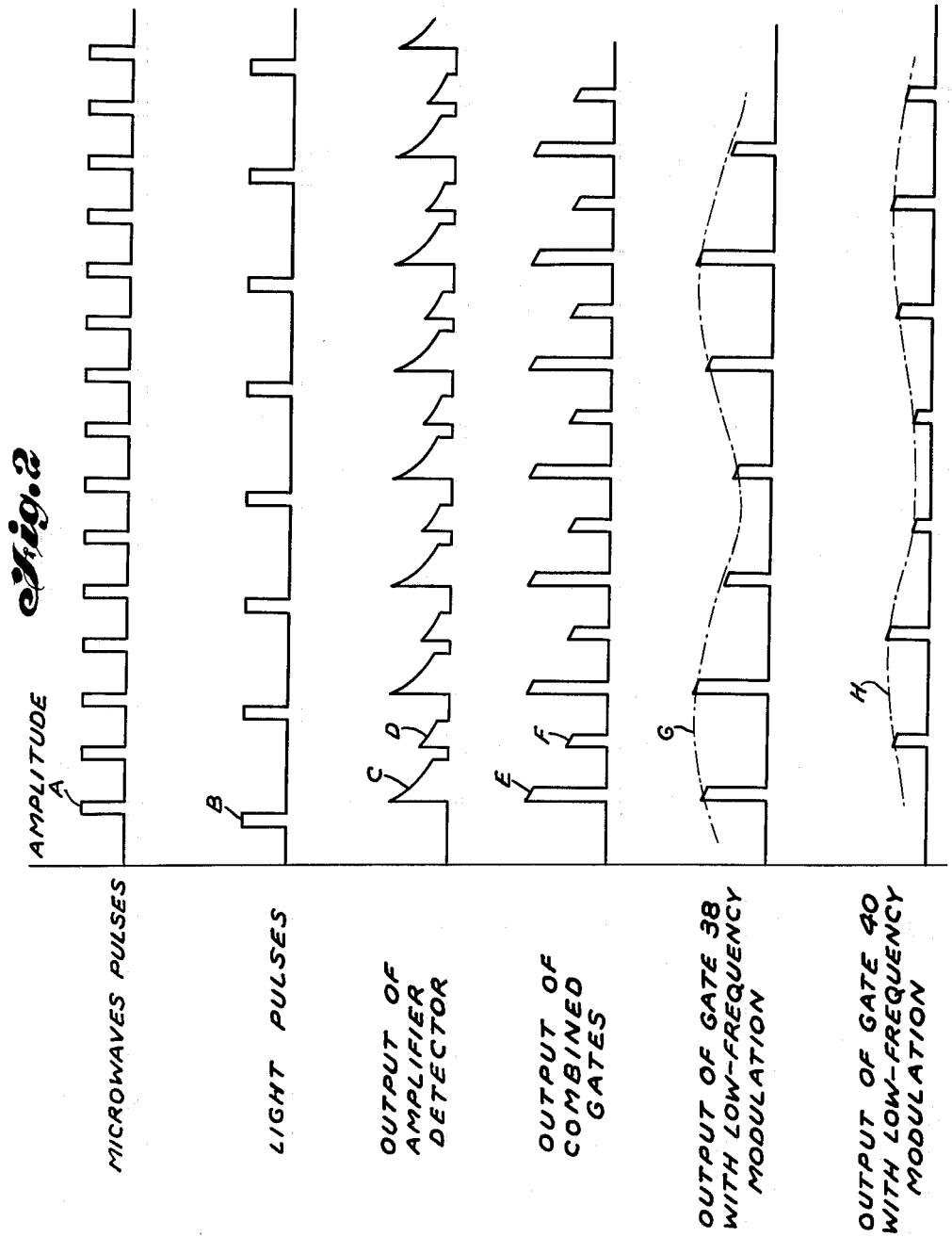

*Fig. 3*
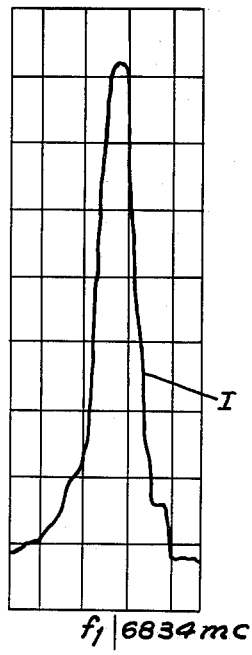
(A)
$f_1$ | 6834 mc
(B)
$f_2$
INVENTOR.
MAURICE ARDITI
BY Edward Goldberg
ATTORNEY 3,234,483
HIGH STABILITY GAS CELL FREQUENCY
STANDARD
Maurice Arditi, Clifton, N.J., assignor to International
Telephone and Telegraph Corporation, Nutley, N.J., a
corporation of Maryland
Filed Mar. 20, 1964, Ser. No. 353,394
19 Claims. (Cl. 331—3)

This invention relates to gas cell atomic clocks or frequency standards and particularly to an improvement therefor which provides a narrow resonance line width, and when employing optical pumping, eliminates frequency shifts caused by the pumping light, thus resulting in greater stability.

In general the broadening of the inherent atomic or molecular resonance line in a gas cell is produced mainly by the thermal velocity of the atoms or molecules with respect to the direction of an applied R.F. field, which is known as the Doppler effect. Reduction of this effect can be obtained by the use of non-magnetic buffer gases. However, the ultimate line width is limited by the thermal collisions between atoms or molecules. Atoms in the gas cell with relaxation times greater than the mean time in the cell envelope can be subjected to more than one R.F. pulse and the resonance line thus has a width characteristic of the pulse repetition frequency which can be made several times smaller than the natural line width therein. A discussion of related theory and prior art may be found in articles by N. F. Ramsey, Physical Review, 1950, vol. 78, page 698, concerning atomic beam techniques and by H. M. Goldenberg et al., Physical Review Letters, 1960, vol. 5, page 361, in connection with gas cells.

Atomic clocks incorporating alkali vapor gas cell frequency standards have utilized optical pumping and detection of energy transitions which produce the characteristic spectral resonance line at a fixed frequency. However, the buffer gases in the cell cause a shift in frequency corresponding to their pressure and an additional shift is produced by light intensity variations of the pumping lamp. Thus these atomic clocks do not represent an absolute standard but have been used as secondary standards which change slightly with time due to the light variations. Gas mixtures can be prepared to reduce sensitivity to pressure and temperature, while special optical filtering or high pressure buffer gases can minimize light shifts, but it has not been possible to achieve all of these desired results in one device.

An attempt to obtain narrow line widths was made by C. O. Alley, as described in Quantum Electronics, 1960, page 146. This method employed pulse coherent techniques wherein microwave pulses are used in conjunction with known Zeeman low frequency pulses to excite atomic energy level transitions in a particular phase relationship. Light pulses were used for optical pumping and optical absorption through gas cells for detection. The optical transparency of a cell, however, is not always a true indication of the state of orientation of the atoms and further difficulties occurred in shielding the sensitive apparatus from undesired external magnetic fields. In addition, the signal-to-noise ratio of the optical detection method is poor due to noise in the light source appearing in the detected signal. Thus, elimination of the light shift in a more reliable method would represent an important improvement.

It is therefore the primary object of the present invention to provide an improved reliable gas cell frequency standard.

A further object is to obtain a reduction in the apparent width of the spectral line.

Another object is to increase the stability of atomic clock frequency standards by eliminating frequency shifts caused by the pumping light.

These results may be achieved by a novel system utilizing microwave pulse coherent techniques wherein the optical pumping cycle is separated from the microwave detection cycle. By applying a microwave pulse at the atomic resonance frequency, immediately at the end of this pulse a resultant component of atomic magnetization, which decays with time due to relaxation effects, will remain and will induce a signal in a microwave resonant cavity enclosing the gas cell. This signal will be referred to as the pulse induced coherent emission signal. By applying a second phase coherent microwave pulse to excite the precessing atoms, it is possible to reinforce or decrease the overall magnetization of the atomic system depending upon the frequency of the microwave excitation. The amplitude of the pulse induced signal just after the end of the second microwave pulse will give an oscillatory pattern of narrow lines when the frequency of the microwave excitation is varied around the resonant frequency. This is known as a Ramsey pattern, which in this case provides a resonance line having a width characteristic of the pulse repetition frequency which is considerably smaller than the natural line width. On the other hand, the signal at the end of the first microwave pulse gives the typical broader resonance curve of the atomic transition, with both the broad and narrow line patterns being formed with substantially the same curve envelope and with both signals being available for control purposes. This effect could not readily be achieved with prior atomic beam methods wherein probing of the atoms in a long drift space by a first pulse would interfere with the results of a second pulse.

In order to improve the signal-to-noise ratio of the detection of the pulse induced coherent emission signal, optical pumping is used in the gas cell to increase the change in population distribution of the atoms in the two stable energy levels between which a transition takes place. A continuous pumping light would have the effect of shortening the relaxation time of the atoms and of introducing phase incoherence between the two induced microwave pulses, through optical excitation of the precessing atoms. A careful timing of a pulse sequence of light and microwave is thus necessary to conserve phase coherence and to obtain a spectral pattern with well-defined maxima. If the pulse of resonant light is terminated before the radio frequency pulse is turned off, the longer lived atoms are left precessing in the dark and the second R.F. pulse can be applied. As a result, a larger signal-to-noise ratio and relaxation time can be obtained. Since detection of the microwave stimulated emission takes place when the pulse of light is off, light shifts of frequency are eliminated.

In a system employing this technique, the detection of the pulse induced coherent emission is obtained through a microwave receiver coupled to a microwave cavity containing the gas cell. A small modulation of the frequency at a low rate is applied to the microwave signal, with the modulation envelope appearing at the output of the receiver detector. The light pulse and first and second microwave pulses are repeated in sequence to produce an integrated modulated signal. By comparing the phase of the latter signal with that of the reference modulation in a phase detector and feeding back the error signal to a crystal oscillator, the oscillator is locked to the resonant frequency of the gas cell.

The details of the invention will be more fully understood and other objects will become apparent in the following description wherein:

FIG. 1 is a block diagram of the novel system;

FIG. 2 shows various pulse patterns as they would appear in related portions of the circuit; and FIGS. 3a and 3b represent response curves of the system to different microwave pulses.

As shown in FIG. 1, a glass cell 10 containing rubidium 87 is optically pumped through a rubidium 85 filter cell 12. The filter cell is necessary only when an emission condition or maser action involving population inversion in the Rb 87 is employed. Without the filter cell, the Rb 87 cell acts as an absorption cell. In both cases stimulated emission can be obtained at the end of the microwave pulse and the method is applicable for a frequency standard in absorption or emission conditions. In addition, other alkali atoms such as hydrogen, potassium, sodium or cesium may be used directly in the gas cell without a filter cell. Similar use of an ammonia molecule gas cell is also feasible. A nonmagnetic buffer gas such as neon, argon, other noble gases or nitrogen, hydrogen or mixtures thereof, is generally included in the cell to further reduce line width, increase efficiency of optical pumping and to reduce the sensitivity of frequency to thermal effects. The gas cell is placed in a microwave cavity 14 which is excited at a characteristic frequency corresponding to the known energy separation of the hyperfine levels of the vapor in the ground state. Since the 0–0 hyperfine transition used here is magnetic, it can be induced only when the magnetic lines of force $H_o$ of the R.F. field are parallel to any existing D.C. magnetic fields. A $TE_{011}$ mode cavity is therefore used, with the axis parallel to a constant homogeneous magnetic field, being in the order of a few tenths of an oersted in the region of the cell. The microwave frequency is obtained by multiplication of a predetermined submultiple frequency from a stable crystal oscillator 16 up to 60 megacycles at multiplier 17, for example, and desired harmonics are generated by a varactor diode 18 up to the characteristic 6834 mc. frequency. A small low rate modulation of the frequency is obtained by applying the output of a modulator 19 to phase modulate a low frequency stage 20 of the multiplier chain. An amplifier 21 in series with the multiplier chain is gated by pulses coming from oscillator 22 and permits the microwave energy to be delivered in pulses of various length and timing sequences, without losing the phase-coherence in successive pulses.

The detection of the microwave stimulated emission at the end of the R.F. pulse is obtained through a microwave superheterodyne receiver coupled to the cavity. The signal is combined with that of local oscillator 23 in a mixer stage 24 such as a balanced silicon diode circuit, to provide a 60 mc. intermediate frequency which is fed to an I.F. amplifier 26. To avoid saturation, a gated amplifier 28 turns off the receiver during the time that the initial large microwave pulse is sent into the cavity. The bandwidth of the amplifiers is such that the circuit time constant is small enough not to interfere with the exponential decay of the microwave stimulated emission in the gas cell following the pulse. A second mixing is provided with a local oscillator 30 at 60.1 mc., with the resultant 100 kc. carrier from mixer 32 being amplified and detected in circuit block 34. Double detection aids in narrowing the bandwidth and improving the signal-to-noise ratio. The carrier is then fed in two separate channels, each of which can be gated independently to select either the output at the end of the first R.F. pulse or that after the second R.F. pulse. The need for two such channels will be discussed in further detail hereinafter.

The output of gates 38, 40 is passed through respective integrating circuits 42, 44 to reconstruct a sinusoidal signal which is then fed to corresponding phase detectors 46, 48 wherein the reference voltage is derived from the low frequency modulator 19 which also acts on the microwave carrier to provide the small frequency modulation at a low rate. The error signal from the phase detector is applied through a switch 51 controlled by a timing relay 50, the operation of which will be more fully discussed hereinafter, and a suitable feedback servo loop 52 which tunes a capacitor 36 to control the frequency of the crystal oscillator 16. The resonant light 54 used for optical pumping is also pulsed in synchronism with the pulse oscillator 22 by using an additional pulsed R.F. oscillator 56 to excite the gas discharge, or in another form a motor driven shutter wheel may be synchronized with oscillator 22 to control the light pulses.

FIG. 2 shows the sequence and position of the various R.F. and light pulses and corresponding gated outputs of the receiver. A basic repetition rate is established for the microwave pulses A with the frequency of the light pulses B being set at half this rate. The light pulses are also made to be shorter in time than the period between two microwave pulses and to terminate before the end of the second microwave pulse. When the atoms have sufficiently long relaxation times, the microwave stimulated emission produces a signal at the output of the 100 kc. amplifier detector 34, the envelope of which is shown as exponentially decaying pulses C, D. Gates 38, 40 provide a smaller width of the first portion of these exponential pulses, E, F. With the microwave carrier frequency modulated at a low rate, in the order of 5 c.p.s., and having an average frequency at one side of the peak atomic resonance curve, the output of the gates 38, 40 is an amplitude modulated signal produced in a known manner by the frequency modulation of the carrier acting on the resonance curve which has the effect of a linear frequency discriminator. A sinusoidal signal G, H at the modulation frequency can then be reconstructed by an integrating circuit 42, 44. At least four to five sampling pulses are required during one period of the modulation. The sinusoidal signal is fed into the phase detector 46, 48 which provides an error voltage for the feedback servo loop 52 to correct the frequency of the crystal oscillator so that it coincides with the peak of the atomic resonance curve.

FIG. 3 represents amplitude versus frequency response curves I, J, at the output of respective gates 38, 40 after the first and second microwave pulses. It is seen that the curve I resulting from the first pulse has a broad well-defined maximum, while the second pulse produces a curve J with several maximum and minimum variations within an envelope corresponding to the first curve. A narrow first response curve thus reduces the number of peaks in the second curve. The half-amplitude line width of the resonance curve I is very closely equal to $1/t$, where $t$ is the duration of the microwave pulse A, while the distance between oscillatory peaks in curve J is equal to the inverse of the time interval T between the microwave pulses, as shown in FIG. 2. Since the output of gate 40 provides a curve having much narrower line widths than that of gate 38, the output of phase detector 48 may be utilized advantageously for locking the crystal oscillator to the particular atomic resonance peak.

With several peaks being present in curve J, it is necessary to provide a method for consistently selecting the same peak to avoid ambiguity. This may be achieved by timing relay 50 which, when energized by power supply 58, first connects the output of phase detector 46 to the servo loop 52 to lock the crystal to the well defined first frequency $f_1$ of curve I. After a predetermined time, the relay then switches to connect the output of phase detector 48 to the servo which locks the oscillator to the resonant peak frequency $f_2$ of curve J nearest to $f_1$. Suitable adjustments of pulse widths and repetition rate can be made to select the desired peak without ambiguity. During the switching interval the time constant of the servo maintains the crystal at the first frequency and thereafter the relay and crystal remain in the second frequency position until power is shut off. Other suitable coarse-to-fine automatic tuning systems may similarly be utilized.

In the event of a sudden frequency change of the crystal oscillator, it is possible, due to the time constant of the servo, that the frequency could be locked at a point other than the desired peak. In order to avoid this error, a second integrator 60 may be connected to gate 38 to provide only even and predominantly second harmonics of the modulation frequency. This is used as a monitor of signal strength to emphasize the differences between peaks and select the optimum point for correct locking. The second harmonic is amplified, filtered and fed to the time relay. If the signal drops below a preset level, the relay is activated and the original switching sequence is repeated. This will occur if the signal is weak or the frequency of the crystal does not correspond to the resonance frequency $f_1$. Thus, an accidental lock to a peak frequency other than $f_2$ will be prevented.

In this system the position of the frequency peaks at the output of the second pulse does not depend upon the width of the microwave pulse, but is dependent directly upon the spacing between pulses. This spacing must be accurately controlled to maintain the desired fixed frequency as a high stability standard. However, the present device can provide a repetition frequency from the crystal oscillator many orders of magnitude more accurate than required to maintain precise timing, through a frequency synthesizer 62 fed by the crystal oscillator 16, and controlling the pulse forming oscillator 22. Thus the same oscillator that is controlled by the atomic transition also provides the necessary accuracy for the timing of the pulse. An accuracy of only one part in $10^3$ is required of the frequency synthesizer 62, while the crystal oscillator 16 may be controlled to one part in $10^{12}$ by the atomic transition. It is also necessary to prevent illumination of the Rb 87 cell by resonance light between the two microwave pulses, as even a small amount of resonance light would inhibit the formation of the desired peaked response pattern at the end of the second pulse. The light causes phase-incoherence between the two induced pulses through excitation of the precessing atoms to high energy levels.

A further variation of the system may utilize only one extended pulse in place of two coherent pulses, when the time interval between pulses is sufficiently long for the relaxation to destroy the interference between successive pulses. As shown in connection with FIGS. 2 and 3, near the value of $t$ at the optimum signal, the full line width at half-maximum of the resonance curve I is approximately $1/t$. Secondary peaks decrease rapidly as the frequency moves from the resonance point. It has been found experimentally, however, that secondary maxima and minima, similar to the pattern of curve J, appear more prominently with only one initial pulse of a longer duration. In this case the distance between secondary peaks corresponds closely to $1/t$. This effect is thought to be due to the diffusion of the oriented atoms to different parts of the gas cell having different intensities and phases of the R.F. field. Thus sufficient time is provided so that the atoms appear to be subjected to an equivalent second pulse.

A practical device of sufficient accuracy and signal-to-noise ratio has been made to work accordingly with a single pulse of longer duration. Thus, in the schematic diagram of FIG. 1, gate 40 would not be necessary, with only the output of gate 38 being utilized to lock the oscillator frequency to one of the peaks. Saturation of the receiver is again prevented by maintaining a cut-off state until the end of the main pulse. The optimum peak resulting from the stimulated emission may now be selected manually, with the servo loop open, by direct observation of amplitide when sweeping the oscillator frequency and closing the loop at the desired peak. This can also be done automatically by a circuit which counts the number of times the amplitude passes through a maximum and closes the loop when the selected peak is reached.

Although this system mentions only a sequence of two microwave pulses to achieve a line width reduction, a sequence of three, four or more radio frequency pulses could be used to further reduce the line width. This will be conditioned by the relaxation time of the atoms in the gas cell, which has to be larger if the number of pulses in the sequence is increased. In all cases, no light pulses should be produced between the end of the first microwave pulse and the end of the last microwave pulse used in the sequence, in order to conserve phase-coherence between successive pulses. For practical systems, however, the line width reduction produced by more than two coherent pulses may be limited by the signal-to-noise ratio of the detection.

It may thus be seen that the present invention provides significant advantages over conventional gas cell frequency standards using optical detection methods. Light intensity variations have no effect as detection by the microwave receiver is now accomplished with the light off. Since there is no light shift, it is not necessary to use a buffer gas of high pressure. This in turn reduces the temperature shift which is proportional to the gas pressure and very low temperature coefficients are obtained. The method is also applicable to other alkali metal vapors such as hydrogen, potassium, sodium or cesium. The latter gas, particularly, is useful due to a higher operating frequency which can result in still greater long term stability and smaller sized apparatus. The use of cesium was previously inhibited by difficulties in reducing light shift. Another improvement is the provision of very narrow resonance lines, in the order of 10 c.p.s. or less, which permit greater accuracy and short term stability. The signal-to-noise ratio is greater since it is not necessary to detect a small modulation of a large carrier signal. Only the microwave stimulated emission signal is detected, in the absence of the microwave pulse, and full use of the receiver sensitivity can be made without adjusting delicate microwave bridge balancing. Since the resonant frequency does not depend upon the microwave pulse length or amplitude, but only on the repetition frequency, which can easily be maintained constant by deriving a timing pulse from the locked crystal oscillator, a high degree of accuracy is achieved, with a stability of one part in $10^{11}$ or $10^{12}$ being attainable. In addition, frequency pulling by the tuning cavity is extremely small. However, since it is a practical necessity to calibrate the frequency of the peak to which the crystal oscillator is locked, against a primary frequency standard, the system should be considered as a secondary rather than an absolute standard.

While only a single embodiment has been illustrated, it is apparent that the invention is not limited to the exact form or use shown and that many other variations may be made in the particular design and configuration without departing from the scope of the invention as set forth in the appended claims.

What is claimed is:

1. A gas cell frequency standard comprising:
   a gas cell including a gas therein having a characteristic resonant frequency corresponding to predetermined energy level transitions;

a source of radio frequency energy supplying phase coherent pulses of a given duration at said resonant frequency;

means for tuning said radio frequency source;

microwave cavity means coupled to said gas cell in a predetermined orientation with respect to the electromagnetic field of said radio frequency energy to apply said phase coherent radio frequency pulses to excite said energy transitions in said cell and to induce a resultant phase coherent microwave stimulated emission pulse signal occurring at the end of said pulses;

optical pumping means providing light pulses to said gas cell in synchronism with said phase coherent radio frequency pulses to increase said induced coherent microwave stimulated emission signal, said light pulses being terminated before the end of said radio frequency pulses, and said microwave coherent induced signal being produced during the absence of said light pulses;

microwave receiving and gating means to detect and amplify a first portion of said induced coherent microwave stimulated emission pulse signal;

frequency modulation means applying a low frequency signal to frequency modulate said radio frequency energy and to establish a phase reference signal, said frequency modulation means producing an amplitude modulation of said first portion of said stimulated emission pulse signal, and said amplitude modulated signal having a characteristic line width with respect to frequency inversely proportional to the duration of said radio frequency pulse;

integrating means forming a low frequency sinusoidal signal from a plurality of said amplitude modulated portions of said stimulated emission signal;

means for detecting the phase difference between said sinusoidal signal and said phase reference signal to produce an error signal;

means for feeding back said error signal to said tuning means to control the frequency of said radio frequency source;

means controlling the duration and sequence of said phase coherent pulses of radio frequency to produce a plurality of oscillatory peaks in said stimulated emission signal about said resonant frequency; and means for selecting the peak closest to said resonant frequency and applying a corresponding error signal to control said source.

2. The device of claim 1 wherein said means controlling the duration and sequence of said phase coherent radio frequency pulses provides a repetitive sequence of a plurality of said phase coherent radio frequency pulses to produce said plurality of oscillatory peaks within said characteristic line width.

3. The device of claim 1 wherein said means controlling the duration and sequence of said phase coherent radio frequency pulses provides a repetitive sequence of single pulses of radio frequency of a duration sufficiently long to permit diffusion of the atoms of said gas into regions of said cell in said microwave cavity having differing intensity and phase of said electromagnetic field to produce said plurality of oscillatory peaks, and said optical pumping means provides said light pulses at the same repetition frequency as said sequence of single pulses.

4. The device of claim 2 wherein said radio frequency pulse controlling means generates a sequence of pulses including a first radio frequency pulse to excite said energy transitions and a second coherent radio frequency pulse at a predetermined time thereafter during the occurrence of said resultant stimulated emission signal to produce a second induced emission signal in phase coherence with said first induced emission signal, the first portion of said first induced emission signal producing a signal peak characteristic resonance curve at said resonance frequency, the first portion of said second induced emission signal producing said plurality of oscillatory peaks within said characteristic line width, and said integrating means forms said low frequency sinusoidal signals from said amplitude modulated first portions of said first and second induced emission pulse signals for application to said phase detection means, said phase detecting means including first means for detecting said phase difference from said sinusoidal signal formed of said amplitude modulated portions of said first induced emission signal, and second means for detecting said phase difference from said sinusoidal signal formed of said amplitude modulated portions of said second induced emission signal, and said selecting means applying said error signals from said first and second phase detecting means through said feedback means to said tuning means in succession to lock the frequency of the radio source to said closest frequency peak.

5. The device of claim 4 wherein said radio frequency pulse controlling means includes a pulse oscillator supplying pulses to gate both said phase-coherent radio frequency pulses from said source and said microwave receiving and gating means.

6. The device of claim 5 wherein said light pulses have a duration less than the period between said first and second radio frequency pulses and a repetition frequency half that of the repetition frequency of the radio frequency pulses, said light pulses being absent during the time between said first and second radio frequency pulses, and occurring at a time later than that of said first portion of said induced emission signal after said second radio frequency pulse.

7. The device of claim 6 wherein said microwave resonance frequency is characteristic of the magnetic transition between the 0–0 hyperfine level of the ground state of an alkali metal vapor.

8. The device of claim 7 including mixer and amplifier means coupled to said microwave cavity to convert said microwave induced emission signal at said resonance frequency into a signal at intermediate frequency and amplify said intermediate frequency signal and second mixer and amplifier means for converting said intermediate frequency signal into a lower intermediate frequency signal.

9. The device of claim 8 wherein said receiving and gating means includes first and second gating means respectively selecting samples of said first portion of said first and second induced emission signals from said intermediate frequency amplifier.

10. The device of claim 9 including first and second integrating means connected to respective said first and second gating means to form said low frequency sinusoidal signals from said first and second induced emission signals, said first and second phase detecting means producing error signals from said first and second low frequency sinusoidal signals with respect to said phase reference signal.

11. The device of claim 10 wherein said selecting means includes a time delay relay having a first position connecting said first phase detecting means to said feedback means, and a second position connecting said second phase detecting means to said feedback means.

12. The device of claim 11 including a third integrating means connected between said first gating means and said selecting means to generate only even harmonics and predominantly the second harmonic of said low frequency modulation signal to prevent said selecting means from selecting a peak signal below a predetermined level and other than that closest to said resonant frequency.

13. The device of claim 12 wherein said source of radio frequency energy includes a crystal controlled oscillator, a frequency multiplier chain and a harmonic generator, said frequency modulation means applying phase-modulation at a low frequency to a low frequency stage of said frequency multiplier chain.

14. The device of claim 13 wherein said pulse controlling means includes a frequency synthesizer controlling the timing of the radio frequency pulses and light pulses, said frequency synthesizer being driven by a signal from the crystal controlled oscillator.

15. The device of claim 14 wherein said feedback means includes a servo loop applying said error signal to a tuning capacitor to control the frequency of said crystal controlled oscillator.

16. The device of claim 15 wherein said gas cell contains an alkali metal vapor of the group consisting of hydrogen, potassium, sodium, rubidium or cesium.

17. The device of claim 16 wherein the gas cell includes a buffer gas.

18. The device of claim 17 wherein said optical pumping means includes a gas discharge lamp producing an absorptive condition in said gas cell.

19. The device of claim 18 wherein said optical pumping means includes a gas cell filter producing an emissive condition in said gas cell.

No references cited.

ROY LAKE, *Primary Examiner.*